United States Patent [19]

Fisher et al.

[11] 4,187,267
[45] Feb. 5, 1980

[54] LASER SAFETY SYSTEM

[75] Inventors: Philip H. Fisher, Lambertville, Mich.; Lawrence D. Ninneman, Toledo, Ohio

[73] Assignee: Owens-Illinois, Inc., Toledo, Ohio

[21] Appl. No.: 908,171

[22] Filed: May 22, 1978

[51] Int. Cl.$^2$ .............................................. B29C 17/07
[52] U.S. Cl. .................................. 264/40.1; 264/22; 264/538; 425/137
[58] Field of Search ................. 264/40.1, 40.2, 94, 264/97, 537, 538, 22; 425/136, 137; 250/223 R, 561

[56] References Cited

U.S. PATENT DOCUMENTS

| 3,100,913 | 8/1963 | Dematteo | 425/137 |
| 3,510,664 | 5/1970 | Nichols | 250/223 R X |
| 3,812,349 | 5/1974 | Gugliotta et al. | 250/223 R |
| 3,834,848 | 9/1974 | Farrell | 425/136 |
| 3,983,388 | 9/1976 | Gugliotta | 250/223 R |
| 4,057,378 | 11/1977 | Wunderlich | 425/137 |

FOREIGN PATENT DOCUMENTS

| 1141822 | 12/1962 | Fed. Rep. of Germany | 250/561 |
| 45-34714 | 7/1970 | Japan | 425/137 |

Primary Examiner—Jan H. Silbaugh
Attorney, Agent, or Firm—Richard D. Heberling; Myron E. Click; David H. Wilson

[57] ABSTRACT

A laser detection system for detecting parisons or portions of parisons remaining on cylindrical core pins at an ejection station. Injection molding of tubular parisons around cylindrical core pins occurs at a molding station; cooling the parisons while supported on the core pins occurs at a cooling station; and then, axially stripping the parisons from the core pins occurs at an ejection station. The parison stripping step is accomplished by a horizontally reciprocable carriage which is selectively moved into and out of vertical alignment with a set of core pins and parisons positioned at the ejection station. Sectional gripping members on the carriage are radially closable when in alignment with the parisons, to grasp the parisons for their axial removal from the core pins upon the horizontal displacement of the carriage. The stripped parisons may be held in a horizontal cantilever position between the gripping members during an operational dwell time for additional cooling subsequent to their removal from the core pins. A laser detection device determines if a plastic parison or portion of a parison remains on the core pin after the ejection cycle has occurred, and it prevents the machine from recycling and damaging the injection mold if a parison or portion of a parison remains.

2 Claims, 6 Drawing Figures

LASER SAFETY SYSTEM

BACKGROUND OF THE INVENTION

This invention relates generally to the field of injection molding plastic articles, such as blowable plastic parisons, around a set of cylindrical core pins, cooling the articles while on the core pins, and then stripping the molded articles from the core pins for subsequent processing. After the stripping step, but before recycling of the machine to the injection molding station, a problem has existed in detecting parisons or portions of parisons that remain on the core pins.

The art of forming bottles and containers by blow molding has advanced to the stage where several thousands of such articles can be blown each hour. This necessarily requires that the blowable parisons from which the articles are blown be formed rapidly and inexpensively, either by extrusion or injection molding techniques. In injection molding processes, it therefore becomes important to reduce the overall cycle time. A prior injection molding machine disclosed in copending application Ser. No. 738,508, now U.S. Pat. No. 4,136,146, assigned to the assignee of the present invention, has provided the capability of rapid parison formation at low manufacturing cost. A problem exists in the aforementioned injection molding machine, however, in that after the ejection step, parisons or portions of parisons are sometimes left on the core pins. This creates a potentially unsafe and damaging situation if the machine is recycled to the injection mold with any parison residue on the core pins. If parison residue remains on the core pins when the injection mold halves close, the injection mold may be damaged or the next successive parison may be defective.

SUMMARY OF THE INVENTION

The present invention overcomes these prior shortcomings and problems through an injection molding system which includes a turret mounted for rotation about a vertical axis and having three sets of horizontal core pins radially extending outwardly from the turret. The turret, during rotation, indexes to separate operating stations at which the core pins are located in succession. More specifically, these stations include an injection molding station, a cooling station and a parison ejection station.

A pair of horizontally positioned parison mold sections are provided at the injection molding station and are relatively movable in the vertical direction to selectively close around the sets of core pins. Plasticized thermoplastic material, typically PET, is then injected into the mold spaces between the core pins and the mold sections to form tubular parisons having a finish portion at one extremity and a closed end at the other extremity.

At the cooling station, the injection molded parisons are allowed to cool in the ambient air until the time is right for them to be transferred to the ejection station.

At the ejection station, a horizontally movable carriage is utilized to strip the molded articles from the core pins after they are swung into position by the turret. The horizontally movable carriage includes a plurality of semi-cylindrical sets of gripping surfaces which are formed on radially displaceable ejection blocks to selectively engage and disengage outer peripheral portions of the molded articles. The carriage itself is reciprocable between two primary positions. In the first of these positions, each set of gripping surfaces is radially aligned with a portion of a respective core pin at the ejection station; in the second of these positions, the gripping surfaces are horizontally spaced from the core pins. Actuating means are carried by the carriage for selectively closing the gripping surfaces around the molded articles at the first of the primary positions and for selectively opening the gripping surfaces at the second of the primary locations, to release the plastic article for ejection.

In an optional operation, the displacement means is operable to open the gripping surfaces after the carriage has remained at the second primary location for a dwell period, so that the parisons are held by the closed surfaces in a horizontal cantilevered position after the turret has indexed, thereby providing additional cooling of the parisons.

The present invention provides for a completely overlapped molding, cooling and ejection cycle, due to the three sets of core pins carried by the turret. At any given time, one set of core pins is positioned at the parison-forming or injection molding station; a second set of core pins is at the parison-cooling station; and the third set of core pins is at the parison-cooling and ejection station.

The present invention specifically provides a laser inspection system to detect the presence of a parison or a portion of a parison that remains on a core pin after the ejection cycle has occurred. If a parison or a part of a parison remains on a core pin after the ejection cycle is complete and the machine is recycled, there is likelihood that the injection mold will be damaged or the next successive parison will be damaged by the parison residue. To prevent such potential damage and for other reasons to be enumerated, the present invention includes at least two laser devices, one located at the closed hemispherical parison end and the other located at the finish area of the parison. The laser detection system of the present invention scans across the complete series of aligned core pins to detect the absence of the relatively thin walled parisons at high speed and without contact.

Accordingly, the present invention provides numerous advantages not found in the prior art. First, the overall injection and cooling cycle is designed to maintain an injected parison on a cooled core pin as long as practical, in order to cool the parison to a non-deformable temperature. Second, an ejection system is provided to remove the molded articles from the core pins, and to optionally hold the molded articles in a cantilevered position during a portion of the overall operational cycle for further cooling. Third, a laser detection system (1) detects any parison residue on the core pins after the ejection cycle and (2) prevents operation of the machine if any such residue is detected. Further, the overall system enables the rapid production of cooled tubular parisons for later use in high production blow molding operations.

Other advantages and meritorous features of this invention will be more fully appreciated from the following detailed description and the appended claims.

BRIEF DESCRIPTION OF THE DRAWINGS

FIG. 5 is a detail showing the position of the lasers in relation to the parison body.

DESCRIPTION OF THE PREFERRED EMBODIMENTS

Figure 1:
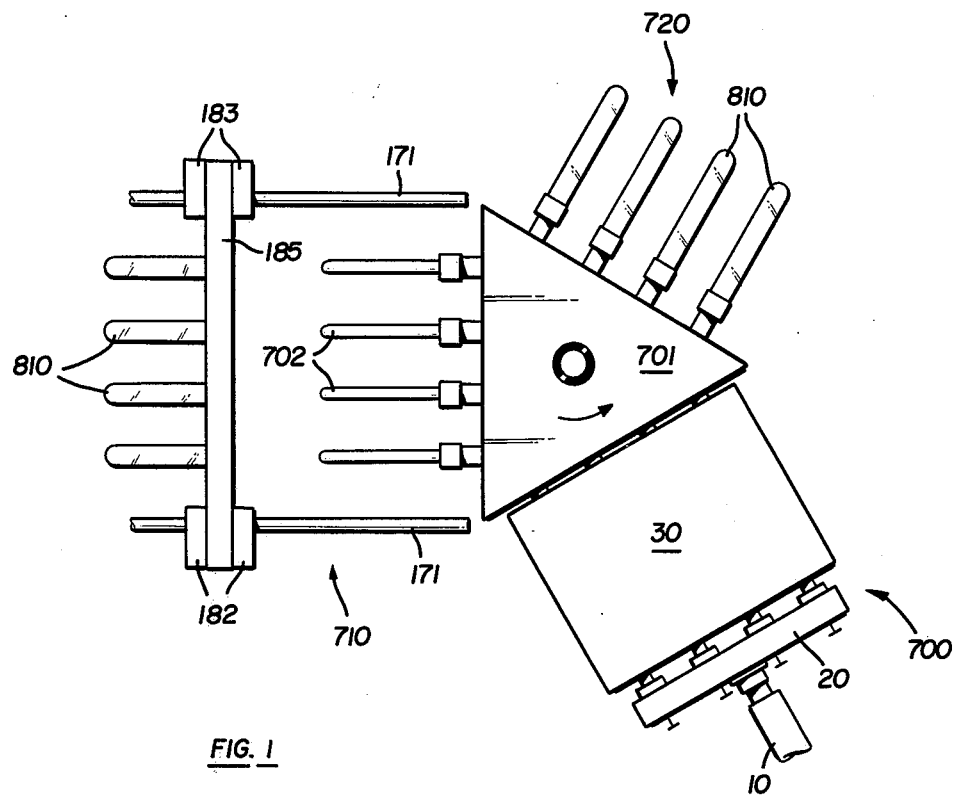
FIGS. 1 and 2 are top plan views showing the operation and movement of the machine from the injection station to the cooling station and finally to the ejection station.

Referring more particularly to the drawings, FIG. 1 illustrates the overall molding, cooling and ejection system, including an injection apparatus 10, which supplies plasticized, thermoplastic material to an injection mold 30 by way of a runner housing 20. A rotatable and vertically movable turret 701 supports three sets of radially extending, identical core pins 702, which are respectively positioned at the molding station 700, the cooling station 720, and a cooling and ejection station 710.

The rotatable turret 701 includes a rotatable support column which may be raised and lowered by conventional hydraulic power means (not shown) and which is rotated by conventional means (not shown), such as a rack and pinion. The disclosed turret arrangement includes four illustrated core pins, in each set of cantilevered core pins, which extend radially from the turret, but this number may be varied as desired.

The plasticizer 10, injection mold 30, and other parts of the basic injection process are disclosed in aforementioned copending application Ser. No. 738,508, now U.S. Pat. No. 4,136,146, which application and the subject matter disclosed therein is incorporated by reference herein.

Figure 2:
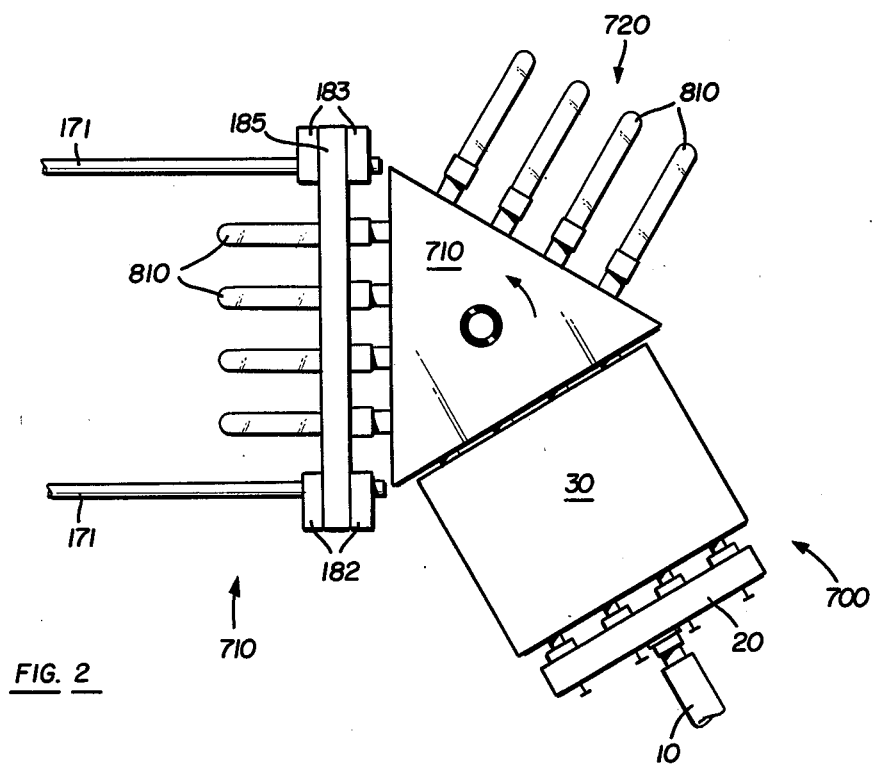

Referring to FIGS. 1 and 2, an ambient air cooling station 720 is interposed between the injection molding station 700 and the ejection and cooling station 710. The vertically movable and rotationally mounted turret 701 includes three sets of core pins 702 which are sequentially positioned at three processing stations. In operation, parisons 810 are injected onto a set of core pins 702 at the injection molding station 700, while the sections of the mold 30 are closed around the core pins. Thereafter, an upper press platen associated with the injection mold is raised and turret 701 is raised to an intermediate position between the upper and lower mold halves. Next, the turret 701 is rotated in a counter-clockwise manner to position the freshly injection molded parisons 810 at an ambient air cooling station 720. At station 720, the parisons are cooled by the ambient air that surrounds them or by positive cooling from a blower, for example (not shown).

After a certain cooling time at station 720, the turret 701 is indexed in a counter-clockwise direction to displace the parisons from station 720 to station 710 for further cooling and ejection. The operation at station 710 is the same as that disclosed in connection with the ejection station disclosed in copending application Ser. No. 738,508, now U.S. Pat. No. 4,136,146.

A problem that sometimes occurs at the ejection station is that parisons or portions of parisons remain on the core pins and fail to be removed from the pins during the stripping cycle. If a parison or a portion of a parison remains on a core pin after the ejection cycle has occurred, damage to the injection mold or to a next successively molded parison can occur when the core pin is rotated to the molding station and the mold halves close with the core pin and parison residue therebetween. Parison residue on the core pins may be caused (1) when formed parisons fail to be ejected; (2) when formed parisons are left in place on the core pins because the ejection blocks, such as 192 and 193 (FIG. 4), are sheared off; (3) when parison finish portions remain on the pin upon breakage of the parison during stripping; or (4) when a "short shot" is formed because insufficient plasticized material is supplied to the parison mold cavities.

Figure 3:
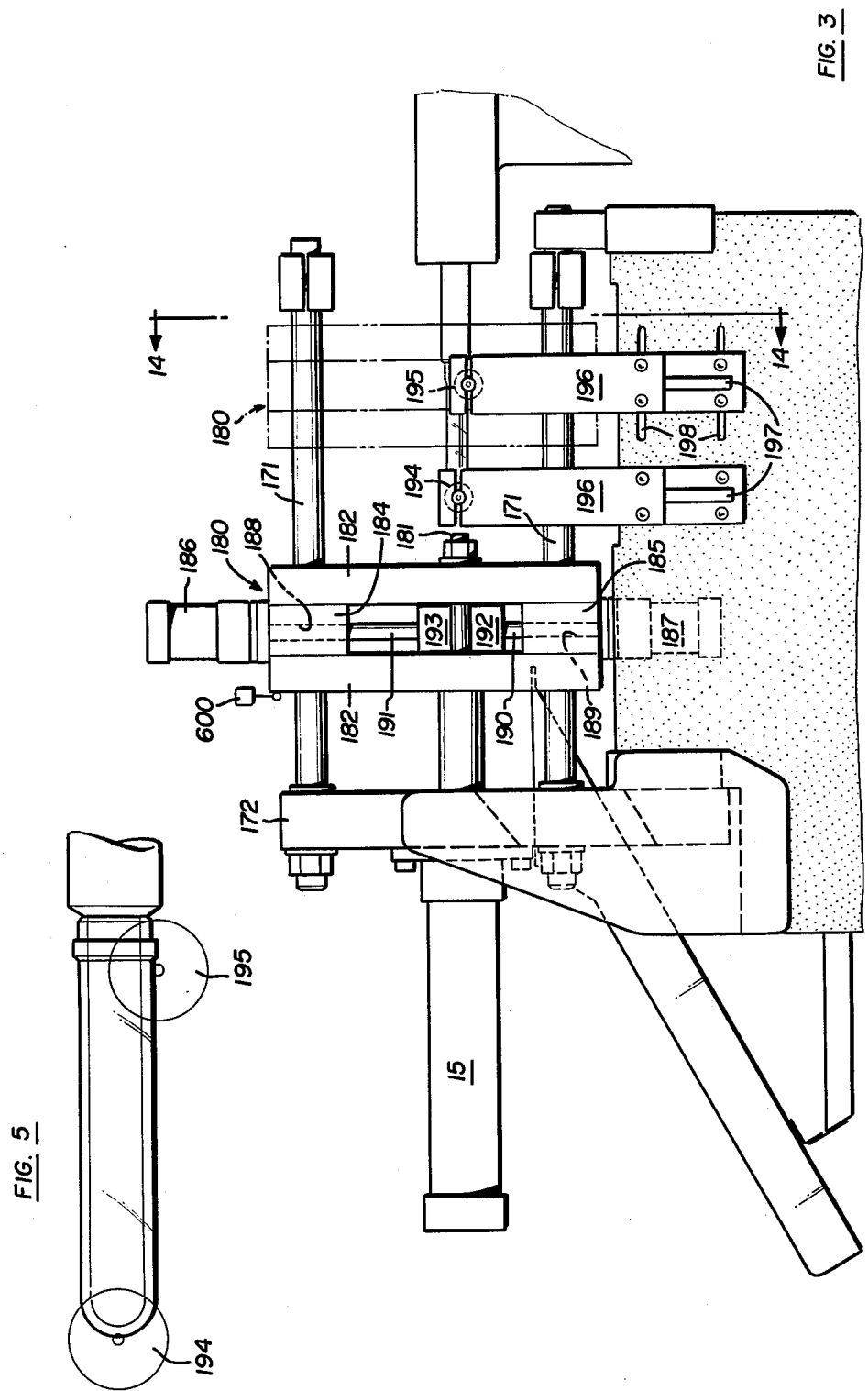
FIG. 3 is a side elevational view of the ejection system with the laser detection system mounted thereon.
Figure 4:
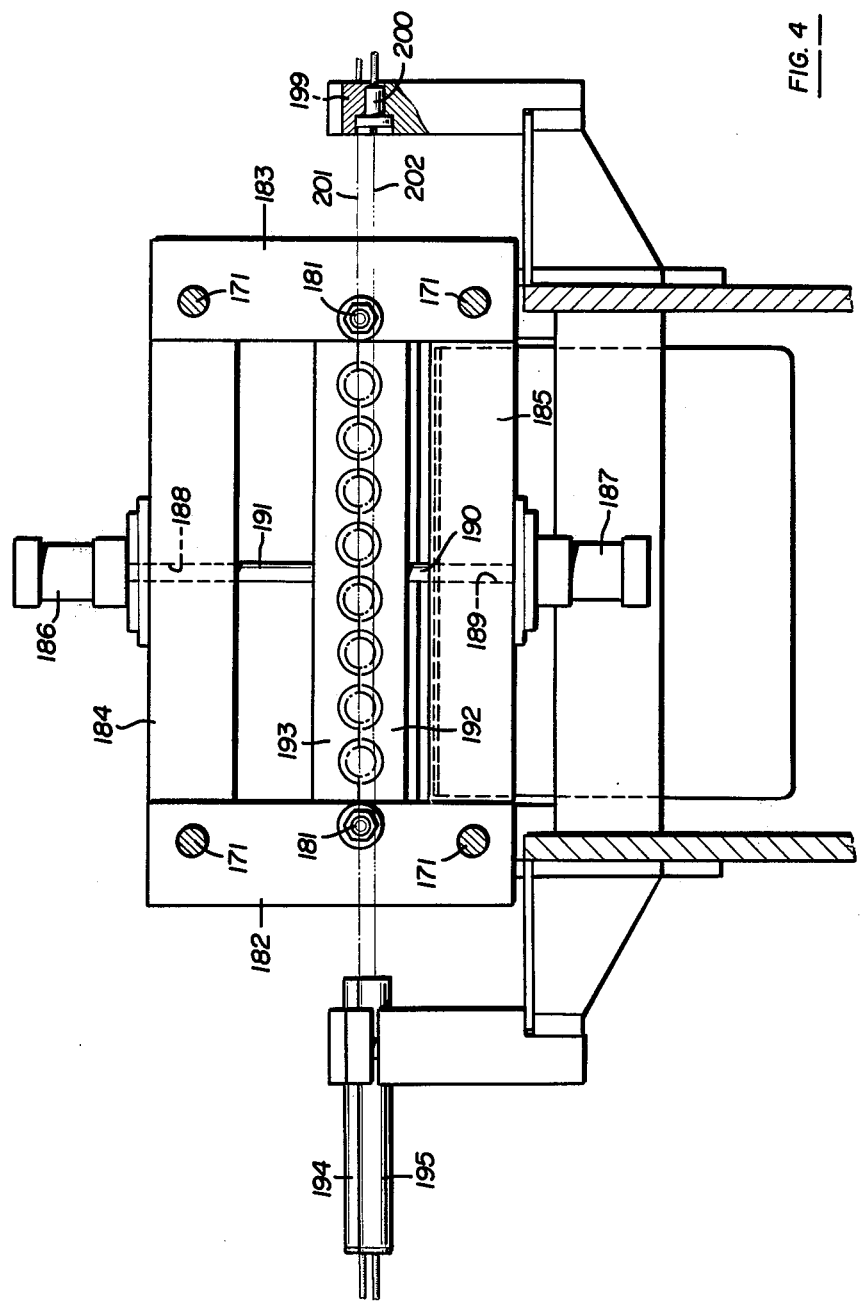
FIG. 4 is a frontal elevational view of the ejection system with the laser detection system mounted thereon.

FIGS. 3 and 4 disclose a system for detecting the presence of a parison or a portion of a parison that remains on the core pin after the ejection cycle has occurred to prevent the press from recycling and damaging the injection mold. The detection system is capable of scanning a multiple number of aligned core pins and detecting the presence of parisons that fail to eject.

The series of aligned core pins at each station spans a distance that is typically on the order of 34 inches. The typical thickness of a parison at its hemispherical end is 0.160-0.180 inches and the thickness dimension in the finish area for a typical parison is 0.060-0.080 inches. The detection device of the present invention is capable of scanning across a series of aligned core pins to detect relatively thin walled parisons during a high speed ejection cycle without contacting the individual parisons.

According to the present invention, a fine beam laser scans the entire array of core pins, both at the hemispherical ends of the parisons and at the finish areas of the parisons. During an ejection cycle, the respective ejection blocks move into position and engage respective parisons. The carriage is then reversed to strip the parisons from the core pins and the two laser beams, if detected by the respective sensors, indicate that the parisons have been successfully removed. If the beams are interrputed by portions of the parisons remaining on the pins, the sensors will not be activated and the automatic machine sequence will be stopped for manual removal of any parisons or portions of parisons remaining on the core pins.

Referring to FIGS. 3 and 4, an ejection station is illustrated having the above described laser detection system for detecting parison residue on core pins. Four tie rods 171 extend from a support structure 172 to receive a reciprocable ejection carriage 180 which is carried by the tie rods 171. The ejection carriage 180 is moved horizontally by rods 181 actuated by two fluid pressure cylinders 15.

The horizontally movable carriage 180 includes a rectangular frame defined by vertical frame members 182 and 183 and upper and lower horizontal frame members 184 and 185, each having suitable openings to receive the four tie rods 171. Two vertically aligned hydraulic cylinders 186 and 187 are respectively secured to the upper and lower frame members 184 and 185. The upper and lower frame members 184 and 185 include vertical bores 188 and 189, respectively, to receive piston rods 190 and 191 associated with each of the hydraulic cylinders. The ends of the piston rods are rigidly secured to respective horizontal ejection blocks 192 and 193. As best shown in FIG. 4, the ejection blocks 192 and 193 have semi-cylindrical gripping surfaces contoured to the finish and neck support ledge on the molded article.

The ejection blocks 192 and 193 are moved toward and away from each other upon actuation of the hydraulic cylinders 186 and 187. The ejection blocks are aligned and guided for opening and closing movement by the frame members 182 and 183 as best seen in FIG. 3. When the ejection blocks 192 and 193 move toward each other and their opposing surfaces abut, the gripping surfaces engage and grasp the finish and neck support region of the molded articles. Then, as the carriage 180 is moved from the position shown in phantom lines in FIG. 3 to the full line position of FIG. 3, the molded plastic parisons are stripped from the core pins. The ejection blocks 192 and 193 may then be immediately retracted by the hydraulic cylinders 186 and 187 to disengage the parisons thereby permitting them to fall onto a conveyor or into a hopper for further processing. Alternatively, the ejection blocks may remain closed while the turret 701 (FIG. 1) is rotated to position another set of core pins at the ejection station with freshly molded articles. During this time the stripped parisons are held in a horizontal cantilevered position to continue cooling, as illustrated in FIG. 1. After rotation of the turret to position another set of core pins at the ejection station and after the release of the parisons from the ejection blocks, the carriage 180 is horizontally displaced back to the phantom-line position shown in FIG. 3 to strip the next set of parisons from the core pins.

In the overall operation, one of the sets of core pins is enclosed within the injection molding machine 700 to receive flowable plastic material from the runner housing. At the same time, the second set of core pins is positioned at the cooling station 720 for cooling. The third set of core pins is positioned at the cooling and ejection station 710 between the cantilevered tie rods 171. During the injection molding step, the horizontally reciprocable carriage 180 is moved from the whole line position shown in FIG. 3 to the phantom position where the gripping surfaces are in alignment with the finish and neck support region of the parison. The ejection blocks 192 and 193 are in a retracted position during the horizontal carriage movement toward the turret 701. After the carriage 180 has been moved into proper alignment with the molded article, the ejection blocks 192 and 193 are moved toward each other by respective piston rods 190 and 191 of hydraulic cylinders 186 and 187 to engage the gripping surfaces with the appropriate portion of the molded parisons. The carriage then is reciprocated back to the whole line position shown in FIG. 3 thereby stripping the parisons from the core pins. The ejection blocks may be opened promptly to drop the molded parisons or alternatively, the ejection blocks may remain closed for a dwell period to hold the parisons in a horizontal cantilevered position for continued cooling as the turret is raised and rotated.

THE LASER DETECTION SYSTEM

The laser detection system of the present invention consists of two lasers positioned to scan the hemispherical parison ends and the parison finish areas, respectively. Referring to FIG. 3, lasers 194 and 195 are mounted on laser mounting brackets 196. Each laser is mounted for vertical adjustment along slot 197. Additionally, laser 195 is mounted for horizontal adjustment along parallel slots 198. As seen in FIG. 4, lasers 194 and 195 emit laser beams 201 and 202, respectively. Beams 201 and 202 are detected by sensing units 199 and 200 which are also mounted on adjustable supports (not shown). As best seen in FIG. 5, laser 194 is positioned to emit a fine beam laser that scans the entire array of core pins at the hemispherical parison ends. Laser 195 emits a fine beam laser that scans the entire array of core pins at the finish area of the parisons. As previously discussed, the distance across the core pins at each station is approximately 34 inches. The typical thicknesses of the parisons being scanned is 0.160-0.180 inches at the hemispherical ends and 0.060-0.080 inches in the finish area of the parisons. Clearly the lasers must emit a fine beam that will only be interrupted by the small thickness of a parison or a portion of a parison that remains on the core pin after the ejection cycle has occurred. An example of a laser-detector combination that is capable of emitting and detecting the fine beam necessary for parison inspection is the Spectra-Physics Model No. 155 laser with an United Detector Technology PIN 10 DP sensor. Other types of lasers and detectors may be utilized if desired and are considered to be within the scope of this invention.

In operation, the horizontally displaceable carriage 180 is moved from the whole line position shown in FIG. 3 to the phantom position wherein the gripping surfaces are in alignment with the finish and neck support region of the respective parisons on the core pins. After the carriage 180 has been moved into proper alignment with the molded articles, the ejection blocks 192 and 193 are moved toward each other into engagement with the appropriate portion of the molded parisons. The carriage 180 is reciprocated back to the whole line position shown in FIG. 3 to strip the parisons from the core pins. After the stripping cycle has taken place, the laser beams 201 and 202 should be seen by the sensors 199 and 200 indicating that the parisons have been successfully removed. If the beams 201 and 202 are interrupted by a parison or portions of a parison remaining on the core pins, the sensors will be activated to signal that the automatic machine sequence be stopped for manual removal of any parisons or portions of parisons remaining on the pins. This prevents the systems from being indexed to initiate a new molding cycle with the possibility of mold damage or the manufacture of unacceptable parisons.

Figure 6:
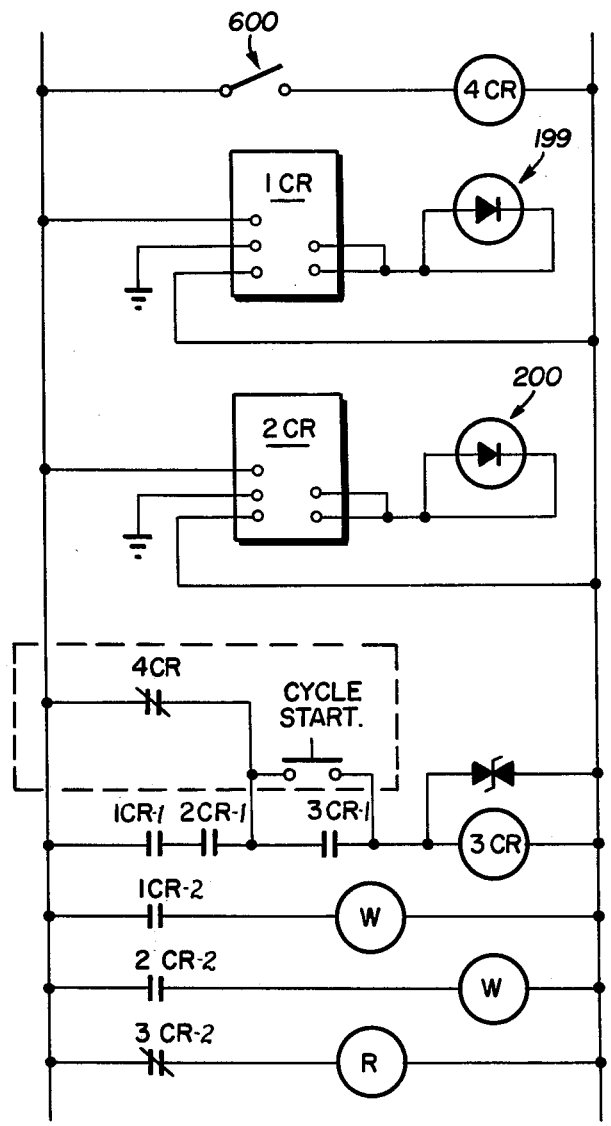
FIG. 6 is a circuit diagram of the laser control system.

Referring to FIG. 6, the electrical circuit for the laser safety system is shown. The lasers 194 and 195 are "on" or emitting beams 201 and 202 at all times, but the lasers are operable to control the machine operation only after the carriage has returned to its whole line position of FIG. 3 and limit switch 600 is closed at the end of an ejection cycle.

At the beginning of a machine cycle, or ejection cycle, the carriage 180 closes limit switch 600 and opens relay 4CR which is in series with the limit switch 600.

When an operator depresses the "cycle start" switch to start the machine, the relay 3CR is energized through the contacts 1CR-1 and 2CR-1. The relay 3CR has one set of contacts (not shown) which, if open, shuts down the entire machine. Once the relay 3CR is energized, the operator can release the "cycle start" switch, which is by-passed by the contacts 3CR-1.

The normally "open" or conductive contacts 1CR-2 and 2CR-2 are connected in series with indicator lights "W" shown in FIG. 6, and these lights are "on" at the beginning of an ejection cycle with no parisons on the core pins. The lights "W" are only intended to give the operator an indication as to the presence or absence of parisons on the core pins.

The operator can release the "cycle start" switch and the carriage 180 will move away from its whole line position or "home" position in FIG. 3 toward its phantom line position in FIG. 3 to strip freshly formed parisons. As the carriage moves, the limit switch 600 is opened and the relay 4CR is closed. Relay 3CR is kept energized by closed 4CR regardless of what happens to contacts 1CR-1 and 2CR-1. During each cycle, when the carriage 180 moves to and from the core pins to strip the parisons, contacts 1CR-1 and 2CR-1 become non-conductive because the parisons and/or carriage block the laser beams 201, 202. Relay 4CR maintains 3CR actuated and the machine operating until the carriage 180 has returned to its home position.

When the carriage 180 returns to the whole line position of FIG. 3, after stripping the parisons from the core pins, limit switch 600 is once again closed and relay 4CR is opened. When 4CR opens, relay 3CR remains energized only if contacts 1CR-1 and 2CR-1 remain conductive. If the laser beams 201 and 202 are not seen by sensors 199, 200, contacts 1CR-1 and 2CR-1 of relays 1CR and 2CR become non-conductive, 3CR is not energized, and the automatic machine sequence stops. Only when the detected parison residue on the core pins has been manually removed from the core pins will contacts 1CR-1 and 2CR-1 be closed, and the operator be able to reset the machine and continue operation. When relay 3CR is opened because of parison residue remaining on the core pins, normally closed contact 3CR-2 will be opened and the parison fault light "R" will come "on". Additionally, one or both of the contacts 1CR-2 and 2CR-2 will be opened, which keeps their respective lights "W" off.

The laser beams are functional to halt further machine operation only when the ejection carriage 180 has returned to close limit switch 600 and to open contacts 4CR. If the parisons are properly stripped from the core pins at the ejection station, then the two indicator lights "W" will be "on" and the machine will continue to operate. If parison residue is sensed at either the finish area of the parisons on the core pins or at the hemispherical parison ends, the parison fault light "R" will come on and the machine will stop until the parison residue is manually removed.

The laser detection system of the present invention is capable of operating at high speeds and scanning a multiplicity of aligned core pins to detect the presence of parisons or portions of parisons that are not stripped from the core pins during the ejection cycle. The laser detection system offers advantages that other possible detection systems do not. For example, contact type detection would involve excessive movable parts that would be susceptible to mechanical breakdown. Detection units that would be capable of weighing an ejected batch of parisons would also be unacceptably slow. Photocell units are not capable of scanning the distance across a number of core pins without resort to expensive optical manipulating equipment. Therefore, the ability of the laser detection system of the present invention to scan across a series of aligned core pins and detecting relatively thin walled parisons at high speed and without contact, is considered to be novel.

It will be apparent to those skilled in the art that the foregoing disclosure is exemplary in nature rather than limiting, the invention being limited only by the appended claims.

Accordingly, having clearly and completely defined my invention, I now claim:

1. In a method of making plastic articles by sequentially and repeatedly injection molding the articles about a series of core pins aligned on a linear path and then stripping the articles from the pins, the article being hollow and having a closed end and an open finish end, the steps of:
   (a) scanning the core pins, after stripping the plastic articles therefrom, with two laser devices to scan the core pins aligned on the linear path to detect the presence of any plastic residue on any of the core pins, one laser device aligned with the finish end forming portions of the core pins and the other laser device aligned with the closed end forming portions of the core pins;
   (b) interrupting the laser beam by the presence of any plastic article residue on any of said pins; and
   (c) halting the operation of the method in the event that the laser beam is so interrupted.

2. In a method of blow molding articles wherein essentially tubular thermoplastic, injection molded parisons are telescopically removed from interior core pins aligned on a linear path and cantilevered from a support, the parisons each having a hemispherical closed end portion at one end and a finish portion at the other end, the steps of:
   axially aligning said parisons as supported on the core pins with pairs of radially spaced gripping surfaces which are axially spaced beyond the free cantilevered ends of said molded articles;
   displacing said gripping surfaces in an essentially single, uninterrupted motion toward the support to a position in radial alignment with portions of the molded articles adjacent the support, by first moving the gripping surfaces toward the free cantilevered ends of the core pins and then past said free cantilevered ends while maintaining the gripping surfaces in radially spaced relationship from the molded articles;
   radially displacing said gripping surfaces toward the axis of the core pins to engage and grip peripheral portions of the molded articles;
   laterally displacing the gripping surfaces in unison away from the support to strip the molded articles from the core pins; and
   detecting the presence of any parison residue on any one of the core pins after stripping without contacting such residue by scanning the core pins aligned in the linear path with two laser devices, one aligned with the hemispherical closed end forming portions of the core pins and the other aligned with the finish forming portions of the core pins.

* * * * *